(12) United States Patent
Dubbaka

(10) Patent No.: US 9,416,764 B1
(45) Date of Patent: Aug. 16, 2016

(54) FLUID FLOW POWER SWITCH

(71) Applicant: Nikhil Dubbaka, Waltham, MA (US)

(72) Inventor: Nikhil Dubbaka, Waltham, MA (US)

( * ) Notice: Subject to any disclaimer, the term of this patent is extended or adjusted under 35 U.S.C. 154(b) by 0 days.

(21) Appl. No.: 14/755,680

(22) Filed: Jun. 30, 2015

(51) Int. Cl.
*F03B 13/00* (2006.01)
*F03B 13/10* (2006.01)
*G01R 21/133* (2006.01)
*E03C 1/02* (2006.01)
*F21S 9/04* (2006.01)

(52) U.S. Cl.
CPC ............ *F03B 13/10* (2013.01); *E03C 1/025* (2013.01); *F21S 9/046* (2013.01); *G01R 21/133* (2013.01)

(58) Field of Classification Search
CPC ........................................ F03B 13/00
USPC ........................................... 290/44
See application file for complete search history.

(56) References Cited

U.S. PATENT DOCUMENTS

| | | | |
|---|---|---|---|
| 3,845,291 A | 10/1974 | Portyrata | |
| 4,122,381 A * | 10/1978 | Sturm | H02J 7/34 290/52 |
| 4,352,025 A * | 9/1982 | Troyen | F03B 13/00 290/54 |
| 4,616,298 A | 10/1986 | Bolson | |
| 4,936,508 A | 6/1990 | Ingalz | |
| 5,316,216 A | 5/1994 | Cammack et al. | |
| 5,699,833 A * | 12/1997 | Tsataros | E03C 1/057 137/624.11 |
| 7,387,401 B2 | 6/2008 | Clark | |
| 7,607,789 B2 | 10/2009 | Lu et al. | |
| 7,841,732 B2 | 11/2010 | Coushaine et al. | |
| 8,292,200 B2 | 10/2012 | Macan et al. | |
| 8,618,687 B2 * | 12/2013 | Burnham | E04H 4/14 290/54 |
| 2007/0220670 A1 * | 9/2007 | Woehrle | B05B 1/18 4/605 |
| 2010/0103646 A1 * | 4/2010 | Coushaine | F03B 13/00 362/96 |
| 2010/0138988 A1 * | 6/2010 | Holmes | E03C 1/055 4/605 |
| 2011/0216526 A1 | 9/2011 | Li | |
| 2012/0159702 A1 * | 6/2012 | Wu | B05B 3/0495 4/606 |
| 2012/0162973 A1 | 6/2012 | Carter | |
| 2012/0181462 A1 * | 7/2012 | Zhou | B05B 1/1609 251/129.01 |
| 2013/0168583 A1 * | 7/2013 | Zhou | B05B 1/18 251/129.01 |
| 2014/0289956 A1 * | 10/2014 | Murden | B60R 15/02 4/603 |

FOREIGN PATENT DOCUMENTS

| | | |
|---|---|---|
| CN | 201446026 | 5/2010 |
| CN | 203291980 | 11/2013 |
| EP | 1985700 | 8/2008 |
| WO | 2009000109 | 12/2008 |

OTHER PUBLICATIONS

Yosoo 8.8-15V DC Hydroelectric power Micro-hydro generator Portable water charger, Jun. 29, 2015, http://www.amazon.com/huhushop-TM-Hydroelectric-Micro-hydro-generator/dp/B00HHQVTO6.

* cited by examiner

*Primary Examiner* — Joseph Waks
(74) *Attorney, Agent, or Firm* — Lambert & Associates; Gary E. Lambert; David J. Connaughton, Jr.

(57) ABSTRACT

A system is provided for converting flow through a pipe to electric power and then using this electric power productively, through lighting, or the powering of other electronic devices.

20 Claims, 2 Drawing Sheets

FLUID FLOW POWER SWITCH

BACKGROUND OF THE INVENTION

1. Field of the Invention

The present invention relates generally to a device for providing electric energy from fluid flow through a shower or bath piping. More particularly the present invention relates to a device configured to power a light or lights based on the electric power produced from the fluid flow through a shower or bath piping.

2. Description of Related Art

Daily showering is very common in the United States and throughout the rest of the world. This daily showering constitutes a notable percentage of a normal home's daily energy consumption. This energy is consumed through three primary sources: Water flow; heating the water; and powering lights in the bathroom. Many bathrooms are without windows to provide privacy. In bathrooms having windows, shades or blinds are typically drawn to enhance privacy. Therefore, natural lighting is not an option in most cases during showering. As such, using electric lighting is a necessity in nearly all showering situations. This electric lighting leads to a notable consumption of electricity. At the same time, a large amount of excess energy is available by the water pressure powering the shower. This energy simply exits the shower, and down the drain.

Therefore, what is needed is a device that may utilize excess energy from a fluid flow of a shower to convert this energy to electrical power, providing lighting for the bathroom.

SUMMARY OF THE INVENTION

The subject matter of this application may involve, in some cases, interrelated products, alternative solutions to a particular problem, and/or a plurality of different uses of a single system or article.

In one aspect, a system for generating electrical power from a fluid flow of a shower is provided. The system includes an electric generator positioned along a piping of a shower, this piping terminates at a shower head, with the electric generator being upstream from the shower head. In a particular embodiment, the generator may be installed immediately upstream of the shower head. The system further has a light source in electronic communication with the electric generator. The light source is configured to be turned on when a fluid is flowing through the piping based on an electric power provided to the light source by the electric generator. In one embodiment, the light source is further in communication with a building electric power source, and is controllable by a switch that provides electricity to the light source in a first position, and prevents electricity from reaching the light source in a second position. The system may further include a logic controller in electronic communication with the building electricity source that is also in electronic communication with the electric generator. The logic controller is configured to prevent electricity from reaching the light source from the building electricity source in a shower mode when the electric generator is providing electric power to the light source. The logic controller is further configured to allow electricity to go to the light source from the building electricity source in a primary mode when the electric generator is not providing electric flow to the light source.

In another aspect, a system for generating electrical power from a fluid flow of a shower is provided. The system may have an electric generator positioned along a piping of a shower, this piping terminates at a shower head, with the electric generator being upstream from the shower head. In a particular embodiment, the generator may be installed immediately upstream of the shower head. The system further has a light source in electronic communication with the electric generator. The light source is configured to be turned on when a fluid is flowing through the piping based on an electric power provided to the light source by the electric generator. The system also has a second light source in communication with a building electricity source. This second light source is controllable by a switch that provides electricity to the second light source in a first position, and prevents electricity from reaching the second light source in a second position. The system may include a logic controller in electronic communication with the building electricity source and the electric generator. The logic controller is configured to prevent electricity from reaching the second light source from the building electric power source in a shower mode when the electric generator is providing electric power to the light source. The logic controller is further configured to allow electricity to reach the light source from the building electricity source in a primary mode when the electric generator is not providing electric flow to the light source.

DETAILED DESCRIPTION

Figure 1:
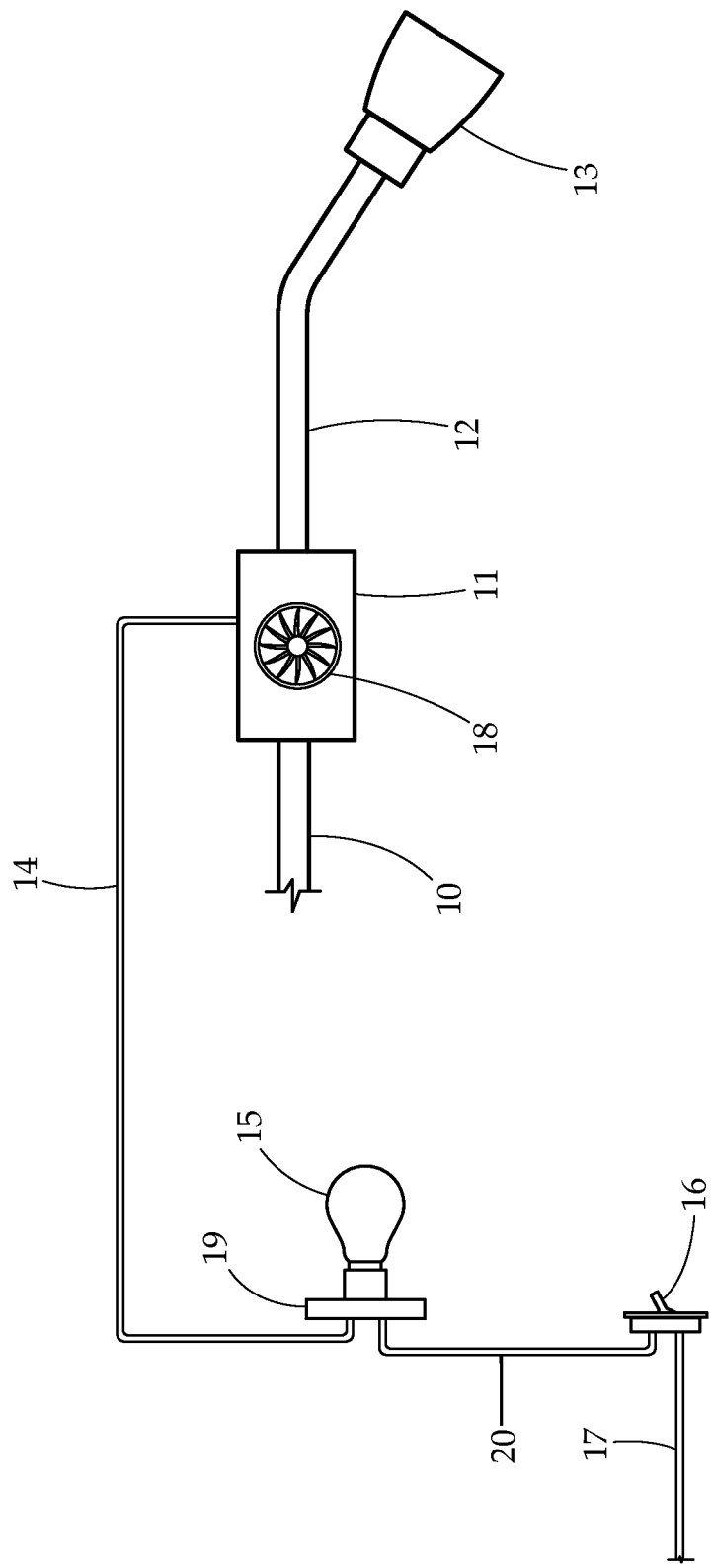
FIG. 1 provides a schematic view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a system for converting flow through a pipe to electric power and then using this electric power productively, through lighting, or the powering of other electronic devices. In further embodiments, the present invention may be used with a logic device such as a switch and/or a computerized microprocessor to selectively utilize the generated electric power in conjunction with electric power from a power grid. In one embodiment, the system is particularly suited for use in bathroom shower applications.

The fluid flow power source system of the present invention generally involves an electric generator having a turbine or equivalent in fluid communication with pipes at an inlet and outlet. Fluid flow through the generator provides an electric power that can be output to an electric device (such as a light) for use. In one embodiment, the generator is positioned upstream of a shower head. In another embodiment, the generator is integrated with the shower head. In still another embodiment, the generator may be positioned on an outlet drain pipe of a shower.

The generator may be any type of device, known or to be discovered, capable of using fluid flow to generate electrical power. In a particular embodiment discussed herein, the generator may comprise a turbine connected to a rotor, the rotor rotatable relative to a stator to generate electricity. The generator may further have an output for connection to electronic devices. In varying embodiments, the generator may produce alternating current, or direct current electric power. However, it should be understood that any generator may be used without straying from the scope of the present invention.

In one embodiment, an electric light source may be in communication of the electric power output of the generator. Upon the generator producing electric power, the light source may be activated, providing light for the bathroom (or other space it is being used in).

In one embodiment, a logic system may be employed to optimize the effectiveness of the present invention. The logic system is configured to activate and deactivate a built in room lighting system connected to a building's electric power system depending on if the present system is generating electric power to provide lighting. In a particular example, when a user enters the bathroom, all lighting will be off. The user may then turn on the primary lighting (that is, the lighting connected to the building's electricity source). This lighting may be in communication with the logic system. Once the shower is turned on, fluid flow powers up (from the generator) either a second light source, or sends power to the primary lighting. In either case, the electric power from the building is shut off to the primary lighting when the shower is on, leaving the only energy source providing lighting. When the user again shuts off the shower—which will result in a ceasing of power produced by the generator, at any point, the primary light source and power from the building electricity source connects again, powering the primary light source. As such, the system may be set up so that if the shower is on, causing electric power to be produced, the building power to the bathroom lighting is shut off. Once the shower ends, building electricity immediately returns to power the light source.

This switching of power sources based on when the water is flowing or not may be achieved in any manner. In one embodiment, a logic system of a simple switching mechanism may provide the functionality required. In another embodiment, a computerized system using a microprocessor may be programmed with the logic required and may be in communication with one or more switches to provide the functionality required.

The system may further include a manual override switch to override the functionality discussed above. For example, this switch may ensure that the primary building power stays on regardless of electric power from the generator.

In still a further embodiment, the system may further comprise a meter in communication with the generator. The meter may be configured to measure and log an amount of electricity generated by the system, and further may measure and log an amount of electricity saved. The meter may display this to a user, or may provide it in an output format such as a print or electronically displayed document. A computer having a microprocessor and a display may be in communication with the meter. The computer may generate a report using the microprocessor, and may display this report using the display.

Turning now to FIG. 1, an embodiment of the present invention is shown in a schematic view. A water piping 10 for the shower, bath or other water flow system enters the generator 11 at the generator inlet. When fluid is flowing, it spins turbine 18 (or other structure movable by fluid flow). This provides energy which can be converted to electricity by generator 11, as discussed above. A further length of fluid piping 12 is provided on the outlet of the generator 11, which flows downstream to a shower head 13 (or other fluid outlet).

A wire 14 allows the generated electricity to flow out of the generator. Wire 14 connects to a light source 15, and can power it (generate light). In addition, a building electrical system, comprising power wire 17, switch 16 and wire 20 is connected to the light source 15. A switching mechanism 19 operating as a logic mechanism sits between the light source 15 and wire 14, as well as between light source 15 and wire 20. The switching mechanism 19 is configured such that upon receipt of a sufficient power input from generator 11 via wire 14, it prevents flow of electricity from the building electrical system, using electrical power only from the generator 11 to power the light source. Further, the switching mechanism 19, after ceasing to receive electricity through wire 14, allows electrical flow from the building electrical system.

Figure 2:
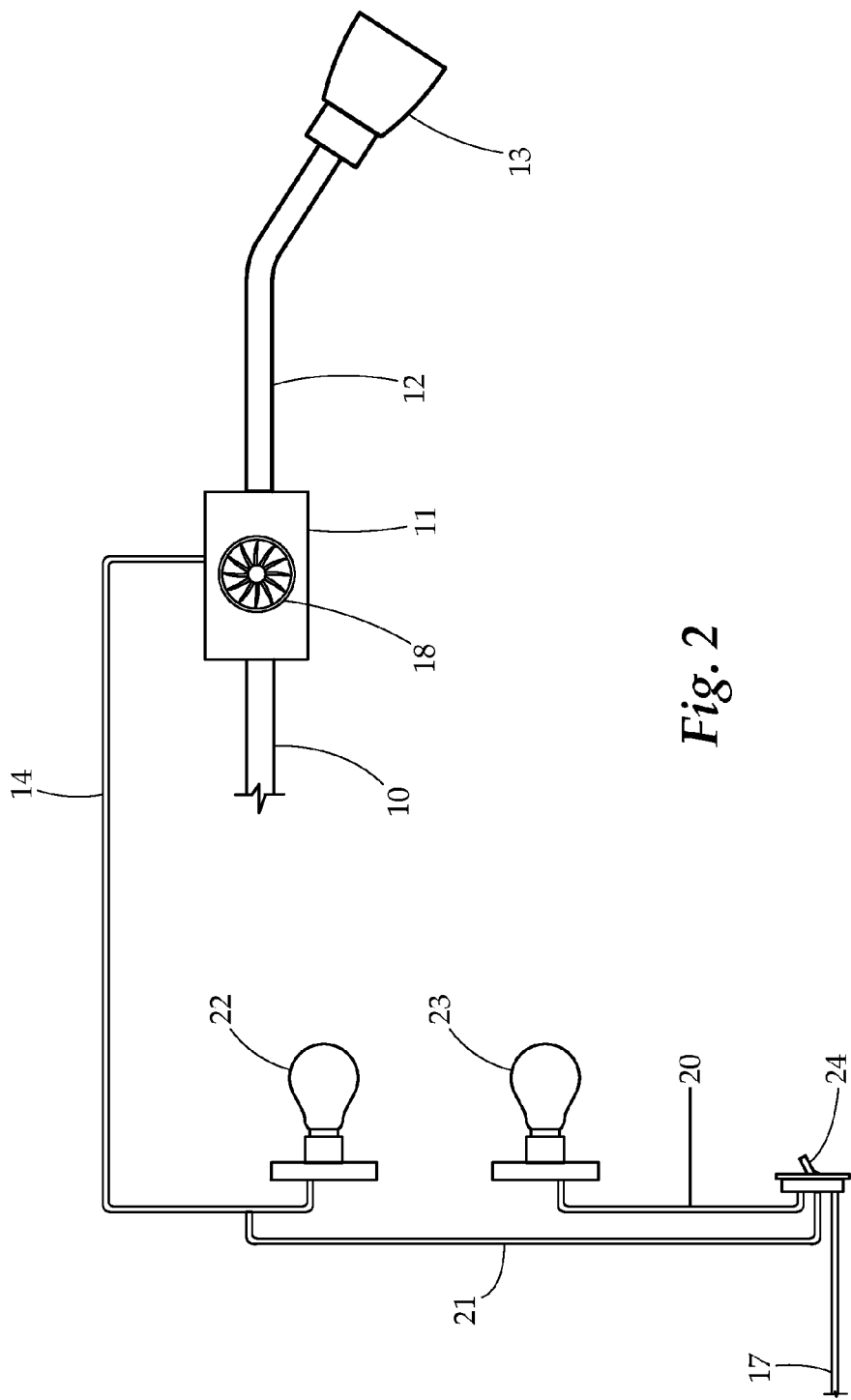
FIG. 2 provides a schematic view of another embodiment of the present invention.

FIG. 2 shows another embodiment of the present invention in a schematic view. A water piping 10 for the shower, bath or other water flow system enters the generator 11 at the generator inlet. When fluid is flowing, it spins turbine 18 (or other structure movable by fluid flow). This provides energy which can be converted to electricity by generator 11, as discussed above. A further length of fluid piping 12 is provided on the outlet of the generator 11, which flows downstream to a shower head 13 (or other fluid outlet).

A wire 14 allows the produced electric power to flow out of the generator 11. Wire 14 connects to a first light source 22, and can power it (generate light). In addition, a building electrical system, comprising power wire 17, switch 24 and wire 20 is connected to a second light source 23. Wire 21 provides communication between wire 14 and the switch 24. Within the switch 24 is a logic controller mechanism that, if generator 11 and wire 14 are active, shuts off electric power flow from wire 17 to wire 20, thus shutting off second light source 23 even if switch 24 is turned to an on position. In the case that electric power is available through wire 14 (caused by the generator generating this electricity), first light source 22 will be active. As such, in both the configuration of FIGS. 1 and 2, there will be little to no interruption in light, and electricity usage from the building power system may be reduced by replacing it with the generated electricity from the present invention.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for generating electrical power from a fluid flow of a shower piping comprising:

an electric generator positioned along the piping of the shower, the piping terminating at a shower head, the electric generator upstream from the shower head;

a light source in electronic communication with the electric generator, the light source configured to be turned on when a fluid is flowing through the piping based on an electric power provided to the light source by the electric generator;

wherein the light source is further in communication with a building electricity source, and is controllable by a switch that provides electricity from the building electricity source to the light source in a first position, and prevents electricity from the building electricity source from reaching the light source in a second position;

a logic controller in electronic communication with the building electricity source and in electronic communication with the electric generator, the logic controller configured to prevent electricity from reaching the light source from the building electricity source in a shower mode when the electric generator is providing electric power to the light source, and configured to allow electricity to reach the light source from the building electricity source in a primary mode when the electric generator is not providing electric power to the light source.

2. The system of claim 1 wherein the electric generator is immediately upstream of the shower head.

3. The system of claim 1 wherein the generator further comprises a turbine.

4. The system of claim 1 wherein the generator is an alternating current generator.

5. The system of claim 1 wherein the generator is a direct current generator.

6. The system of claim 1 wherein the light source is a light bulb.

7. The system of claim 6 wherein the light bulb is directly mounted to the generator.

8. The system of claim 1 further comprising a meter in communication with the generator, the meter configured to measure and log an amount of electricity generated by the generator.

9. The system of claim 8 further comprising a computer in communication with the meter, the computer configured to generate a report based on the logged amount of electricity generated using a microprocessor, and to display the generated report using a display.

10. The system of claim 1 wherein the logic controller is a switch.

11. The system of claim 1 wherein the logic controller is a microprocessor.

12. A system for generating electric power from a fluid flow of a shower piping comprising:

an electric generator positioned along the piping of the shower, the piping terminating at a shower head, the electric generator upstream from the shower head;

a light source in electronic communication with the electric generator, the light source configured to be turned on when a fluid is flowing through the piping based on an electric power provided to the light source by the electric generator;

a second light source in communication with a building electricity source, and is controllable by a switch that provides electricity from the building electrical source to the second light source in a first position, and prevents electricity from the building electrical source from reaching the second light source in a second position;

a logic controller in electronic communication with the building electricity source and in electronic communication with the electric generator, the logic controller configured to prevent electricity from reaching the second light source from the building electricity source in a shower mode when the electric generator is providing electric power to the light source, and configured to allow electricity to reach the light source from the building electricity source in a primary mode when the electric generator is not providing electric power to the light source.

13. The system of claim 12 wherein the electric generator is immediately upstream of the shower head.

14. The system of claim 12 wherein the generator further comprises a turbine.

15. The system of claim 12 wherein the generator is an alternating current generator.

16. The system of claim 12 wherein the generator is a direct current generator.

17. The system of claim 12 wherein the first and second light sources are each a light bulb.

18. The system of claim 17 wherein the first light source light bulb is directly mounted to the generator.

19. The system of claim 12 further comprising a meter in communication with the generator, the meter configured to measure and log an amount of electricity generated by the generator.

20. The system of claim 19 further comprising a computer in communication with the meter, the computer configured to generate a report based on the logged amount of electricity generated using a microprocessor, and to display the generated report using a display.

\* \* \* \* \*